United States Patent
Xu et al.

(10) Patent No.: US 10,892,846 B2
(45) Date of Patent: *Jan. 12, 2021

(54) ENHANCED TRANSMISSION TIME INTERVAL BUNDLING DESIGN FOR MACHINE TYPE COMMUNICATIONS

(71) Applicant: QUALCOMM Incorporated, San Diego, CA (US)

(72) Inventors: Hao Xu, Beijing (CN); Wanshi Chen, San Diego, CA (US); Tingfang Ji, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/392,897

(22) Filed: Apr. 24, 2019

(65) Prior Publication Data

US 2019/0253180 A1 Aug. 15, 2019

Related U.S. Application Data

(63) Continuation of application No. 14/244,752, filed on Apr. 3, 2014, now Pat. No. 10,305,626.

(Continued)

(51) Int. Cl.
*H04L 1/18* (2006.01)
*H04L 5/00* (2006.01)
(Continued)

(52) U.S. Cl.
CPC .......... *H04L 1/0007* (2013.01); *H04L 1/1854* (2013.01); *H04L 1/0003* (2013.01);
(Continued)

(58) Field of Classification Search
None
See application file for complete search history.

(56) References Cited

U.S. PATENT DOCUMENTS 10,305,626 B2 * 5/2019 Xu .................. H04L 1/1854
2009/0257421 A1 10/2009 Nakashima et al.
(Continued)

FOREIGN PATENT DOCUMENTS

JP 2012530434 A 11/2012
KR 20100116139 A 10/2010
(Continued)

OTHER PUBLICATIONS

International Preliminary Report on Patentability—PCT/US2014/032974, The International Bureau of WIPO—Geneva, Switzerland, Oct. 6, 2015.

(Continued)

*Primary Examiner* — Mohammad S Adhami
(74) *Attorney, Agent, or Firm* — Patterson & Sheridan, L.L.P.

(57) ABSTRACT

Aspects of the present disclosure provide techniques for enhanced transmission time interval (TTI) bundling design for machine type communications (MTC). A method for wireless communications by a wireless device is provided. The method generally includes determining a mapping of one or more uplink or downlink channels to one or more fixed bundling sizes, wherein each of the one or more fixed bundling sizes indicates a number of transmission time intervals (TTIs) over which a channel should be transmitted and processing transmission of the one or more uplink or downlink channels based on the mapping.

44 Claims, 9 Drawing Sheets

Related U.S. Application Data

(60) Provisional application No. 61/809,184, filed on Apr. 5, 2013.

(51) Int. Cl.
    *H04L 1/00* (2006.01)
    *H04L 1/12* (2006.01)

(52) U.S. Cl.
    CPC .......... *H04L 1/0009* (2013.01); *H04L 5/0007* (2013.01); *H04L 5/0092* (2013.01); *H04L 2001/125* (2013.01)

(56) References Cited

U.S. PATENT DOCUMENTS

| | | | |
|---|---|---|---|
| 2010/0111068 | A1 | 5/2010 | Wu et al. |
| 2011/0222491 | A1 | 9/2011 | Vajapeyam et al. |
| 2013/0242889 | A1 | 9/2013 | Khoryaev et al. |
| 2013/0329701 | A1 | 12/2013 | Bajzec et al. |
| 2014/0056237 | A1* | 2/2014 | Eriksson ............... H04L 1/0006 370/329 |
| 2014/0112259 | A1 | 4/2014 | Bagheri et al. |
| 2014/0133471 | A1 | 5/2014 | Nammi et al. |
| 2014/0247801 | A1 | 9/2014 | Oizumi et al. |
| 2014/0301302 | A1 | 10/2014 | Xu et al. |
| 2014/0362796 | A1 | 12/2014 | Seo et al. |
| 2014/0362832 | A1* | 12/2014 | Rudolf .................. H04L 1/1822 370/336 |
| 2015/0109972 | A1 | 4/2015 | Khoryaev et al. |
| 2015/0117287 | A1 | 4/2015 | Kim et al. |
| 2015/0365924 | A1* | 12/2015 | Gao ........................ H04L 1/08 370/329 |

FOREIGN PATENT DOCUMENTS

| | | | |
|---|---|---|---|
| KR | 20120055452 | A | 5/2012 |
| WO | 2011112681 | A1 | 9/2011 |
| WO | 2013169164 | A1 | 11/2013 |

OTHER PUBLICATIONS

International Search Report and Written Opinion—PCT/US2014/032974—ISA/EPO—Nov. 6, 2014.

LG Electronics: "Cell Acquisition and Reference Signals for Coverage Limiting MTC UES" 3GPP Draft; R1-130263 (MTC LG), 3rd Generation Partnership Project (3GPP), Mobile Competence Centre; 650, Route Des Lucioles F-06921 Sophia-Antipolis Cedex France, vol. RAN WG1, No. St Julian; Jan. 28, 2013-Feb. 1, 2013, Jan. 18, 2013 (Jan. 18, 2013), XP050663395.

LG Electronics: "Text Proposal on Coverage Enhancement for a MTC UE (R1-130264)", 3GPP Draft, vol. RAN WG1, No. #72 Jan. 18, 2013 (Jan. 18, 2013), XP050663396, 16 Pages, 650, Route Des Lucioles; F-06921 Sophia-Antipolis Cedex; France Retrieved from the Internet: URL: http://www.3gpp.org/ftp/tsg_ran/WG1_RL1/TSGR1_72/Docs/ [retrieved on Jan. 18, 2013] sections 9.4.1 and 9.5.4; figure 1.

Partial International Search Report—PCT/US2014/032974—ISA/EPO—Aug. 13, 2014.

Qualcomm Incorporated: "Coverage Enhancement Techniques for MTC," 3GPP Draft; R1-125120 Coverage Enhancement Techniques for MTC, 3rd Generation Partnership Project (3GPP), Mobile Competence Centre; 650, Route Des Lucioles; F-06921 Sophia-Antipolis Cedex; France, vol. RAN WG1, No. New Orleans, USA; Nov. 12, 2012-Nov. 16, 2012, Nov. 3, 2012 (Nov. 3, 2012), 7 pages, XP050662981, Retrieved from the Internet , [retrieved on Nov. 3, 2012], the whole document.

Qualcomm Incorporated: "Power Consumption Considerations for Coverage Enhancements for MTC (R1-135299)",3GPP Draft,vol. RAN WG1, No. #75 Nov. 2, 2013 (Nov. 2, 2013), XP050750892, 650, Route Des Lucioles; F-06921, Sophia-Antipolis Cedex; France Retrieved from the Internet: URL:http://www.3gpp.org/ftp/tsg_ranjWG1_RL1/TSGR1_75/Docs/.

Renesas Mobile Europe Ltd: "Physical Channels Coverage Enhancements for MTC (R1-130423)", 3GPP Draft, vol. RAN WG1, No. #72 Jan. 19, 2013 (Jan. 19, 2013), XP050663706, 6 Pages, 3rd Generation Partnership Project (3GPP), Mobile Competence Centre, 650, Route Des Lucioles, F-06921 Sophia-Antipolis Cedex, France Retrieved from the Internet: URL: http://www.3gpp.org/ftp/tsg_ran/WG1_RL1/TSGR1_72/Docs/ [retrieved on Jan. 19, 2013] section 2.3.

Qualcomm Incorporated:"Coverage enhancement techniques for MTC:," 3GPP Draft; 3GPP TSG-RAN WG1 #72, R1-130589 Coverage Enhancement Techniques for MTC, 3rd Generation Partnership Project (3GPP), Mobile competence Centre; 650, Route Des Lucioles; F-06921 Sophia-Antipolis Cedex; France, vol. RAN WG1, No. St Julian; Jan. 28, 2013-Feb. 1, 2013, Jan. 19, 2013 (Jan. 19, 2013), 7 Pages, XP050663845, Retrieved from the Internet URL:http://www.3gpp.org/ftp/tsg_ran/WG1_RL1/TSGR1_72/Docs/, [retrieved on Jan. 19, 2013], Introduction;p. 1,.

\* cited by examiner

ENHANCED TRANSMISSION TIME INTERVAL BUNDLING DESIGN FOR MACHINE TYPE COMMUNICATIONS

CROSS-REFERENCE TO RELATED APPLICATION(S)

This application is a continuation of U.S. patent application Ser. No. 14/244,752, filed Apr. 3, 2014, which claims benefit of U.S. Provisional Patent Application Ser. No. 61/809,184, filed Apr. 5, 2013, which are herein incorporated by reference in their entirety.

BACKGROUND

I. Field

Certain aspects of the present disclosure generally relate to wireless communications and, more particularly, to techniques for enhanced transmission time interval (TTI) bundling design for machine type communications (MTC).

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE)/LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A wireless communication network may include a number of base stations that can support communication for a number of wireless devices. Wireless devices comprise user equipments (UEs) and remote devices. A UE may be a device that operates under direct control by humans. Some examples of UEs include cellular phones, smart phones, personal digital assistants (PDAs), wireless modems, handheld devices, laptop computers, tablets, netbooks, smartbooks, ultrabooks, etc. A remote device may be a device that operates without being directly controlled by humans. Some examples of remote devices include sensors, meters, monitors, location tags, etc. A remote device may communicate with a base station, another remote device, or some other entity. Machine type communication (MTC) refers to communication involving at least one remote device on at least one end of the communication.

SUMMARY

Certain aspects of the present disclosure generally relate to wireless communications and, more particularly, to techniques for enhanced transmission time interval (TTI) bundling design for machine type communications (MTC).

Certain aspects of the present disclosure provide a method, corresponding apparatuses and program products, for wireless communications by a wireless device. The method generally includes determining a mapping of one or more uplink or downlink channels to one or more fixed bundling sizes, wherein each of the one or more fixed bundling sizes indicates a number of transmission time intervals (TTIs) over which a channel should be transmitted and processing transmission of the one or more uplink or downlink channels based on the mapping.

In aspects, the corresponding apparatus generally includes means for determining a mapping of one or more uplink or downlink channels to one or more fixed bundling sizes, wherein each of the one or more fixed bundling sizes indicates a number of transmission time intervals (TTIs) over which a channel should be transmitted and means for processing transmission of the one or more uplink or downlink channels based on the mapping.

In aspects, the corresponding apparatus generally includes at least one processor configured to determine a mapping of one or more uplink or downlink channels to one or more fixed bundling sizes, wherein each of the one or more fixed bundling sizes indicates a number of transmission time intervals (TTIs) over which a channel should be transmitted and process transmission of the one or more uplink or downlink channels based on the mapping. The apparatus generally also includes a memory coupled with the at least one processor.

In aspects, the corresponding computer program generally includes a computer readable medium having instructions stored thereon, the instructions executable by one or more processors, for determining a mapping of one or more uplink or downlink channels to one or more fixed bundling sizes, wherein each of the one or more fixed bundling sizes indicates a number of transmission time intervals (TTIs) over which a channel should be transmitted; and processing transmission of the one or more uplink or downlink channels based on the mapping.

Certain aspects of the present disclosure provide a method, corresponding apparatuses and program products, for wireless communications by a wireless device. The method generally includes determining persistent scheduling (PS) assignment for a bundling size specifying a number of transmission time intervals (TTIs) to be used for transmissions of at least one channel, transmitting the at least one channel in one or more TTIs, and terminating transmission of the at least one channel prior to reaching the number of TTIs specified by the bundling size, in response to receiving an indication a receiving device successfully received the at least one channel.

Certain aspects of the present disclosure provide a method, corresponding apparatuses and program products, for wireless communications by a wireless device. The method generally includes receiving an indication of persistent scheduling (PS) assignment for a bundling size specifying a number of transmission time intervals (TTIs) to be used for transmissions of at least one channel, receiving the at least one channel in one or more TTIs, and transmitting an indication to terminate transmission of the at least one channel prior to reaching the number of TTIs specified by the bundling size, if the at least one channel is received successfully.

Certain aspects of the present disclosure provide a method, corresponding apparatuses and program products, for wireless communications by a wireless device. The method generally includes determining persistent scheduling (PS) assignment for a fixed number of resource blocks (RBs) to transmit at least one channel and adjusting at least one a modulation and coding scheme (MCS), rate, or transmit power when transmitting the at least one channel.

Certain aspects of the present disclosure provide a method, corresponding apparatuses and program products, for wireless communications by a wireless device. The method generally includes determining persistent scheduling (PS) assignment for a fixed number of resource blocks (RBs) to transmit at least one channel and processing a transmission of the at least one channel, wherein at least one of a modulation and coding scheme (MCS), rate, or transmit power may be adjusted when transmitting the at least one channel.

Numerous other aspects are provided including methods, apparatus, systems, computer program products, and processing systems.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Aspects of the present disclosure provide techniques for enhanced transmission time interval (TTI) bundling design for machine type communications (MTC). TTI bundling size may be fixed by a one-to-one or a one-to-many mapping. Bundling sizes may be determined for a channel based on bundling sizes used for signaled by another channel. Persistent scheduling can also be used to transmit a channel, where a modulation and coding scheme (MCS), rate, or transmit power can be adjusted for transmission of the channel.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-Advanced, and LTE/LTE-Advanced terminology is used in much of the description below.

An Example Wireless Communications System

Figure 1:
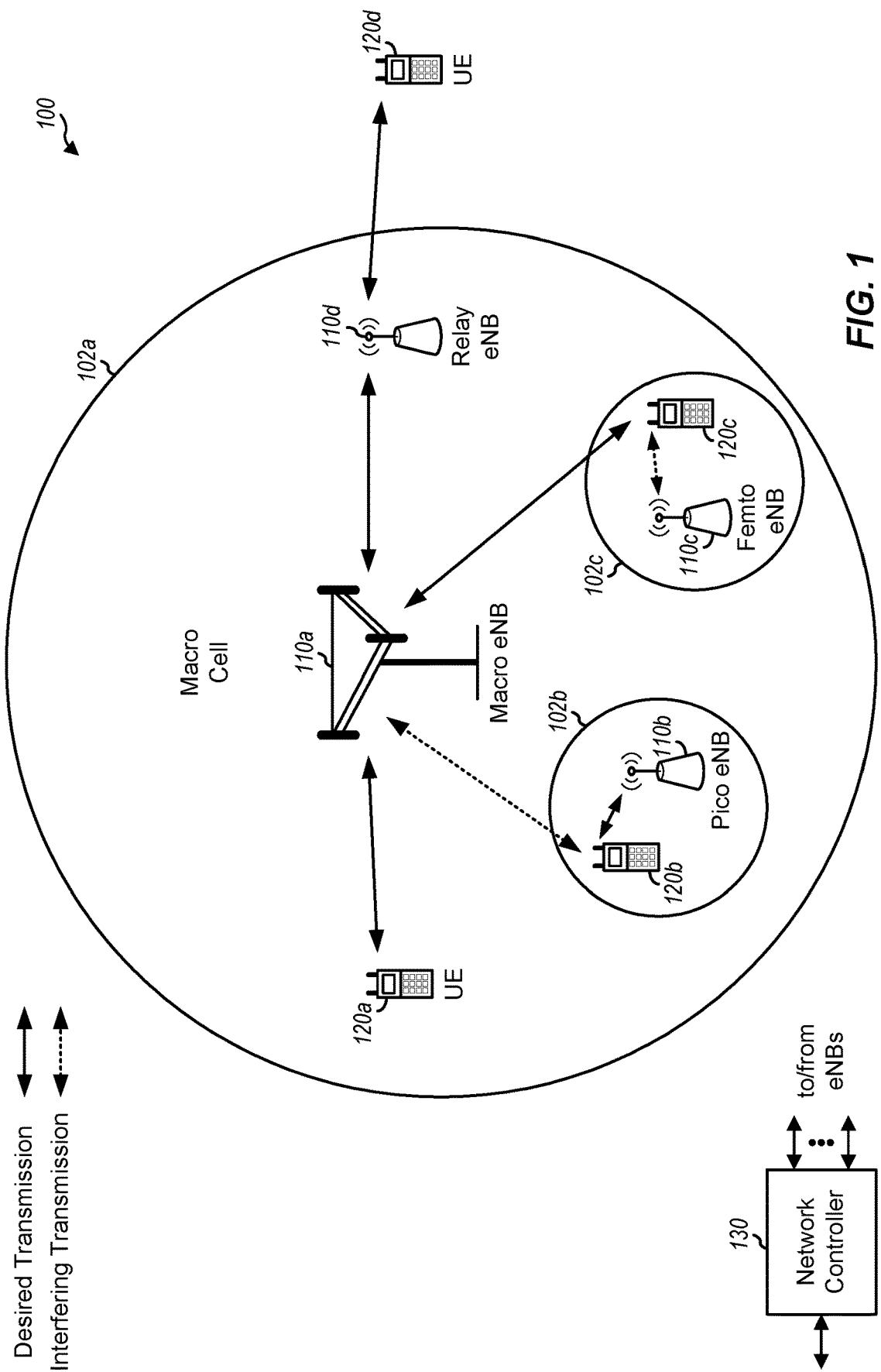
FIG. 1 is a block diagram conceptually illustrating an example of a wireless communication network, in accordance with certain aspects of the present disclosure.

FIG. 1 shows a wireless communication network 100, which may be an LTE network or some other wireless network. Wireless network 100 may include a number of evolved Node Bs (eNBs) 110 and other network entities. An eNB is an entity that communicates with user equipments (UEs) and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station" and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, a smart phone, a netbook, a smartbook, an ultrabook, etc.

Figure 2:
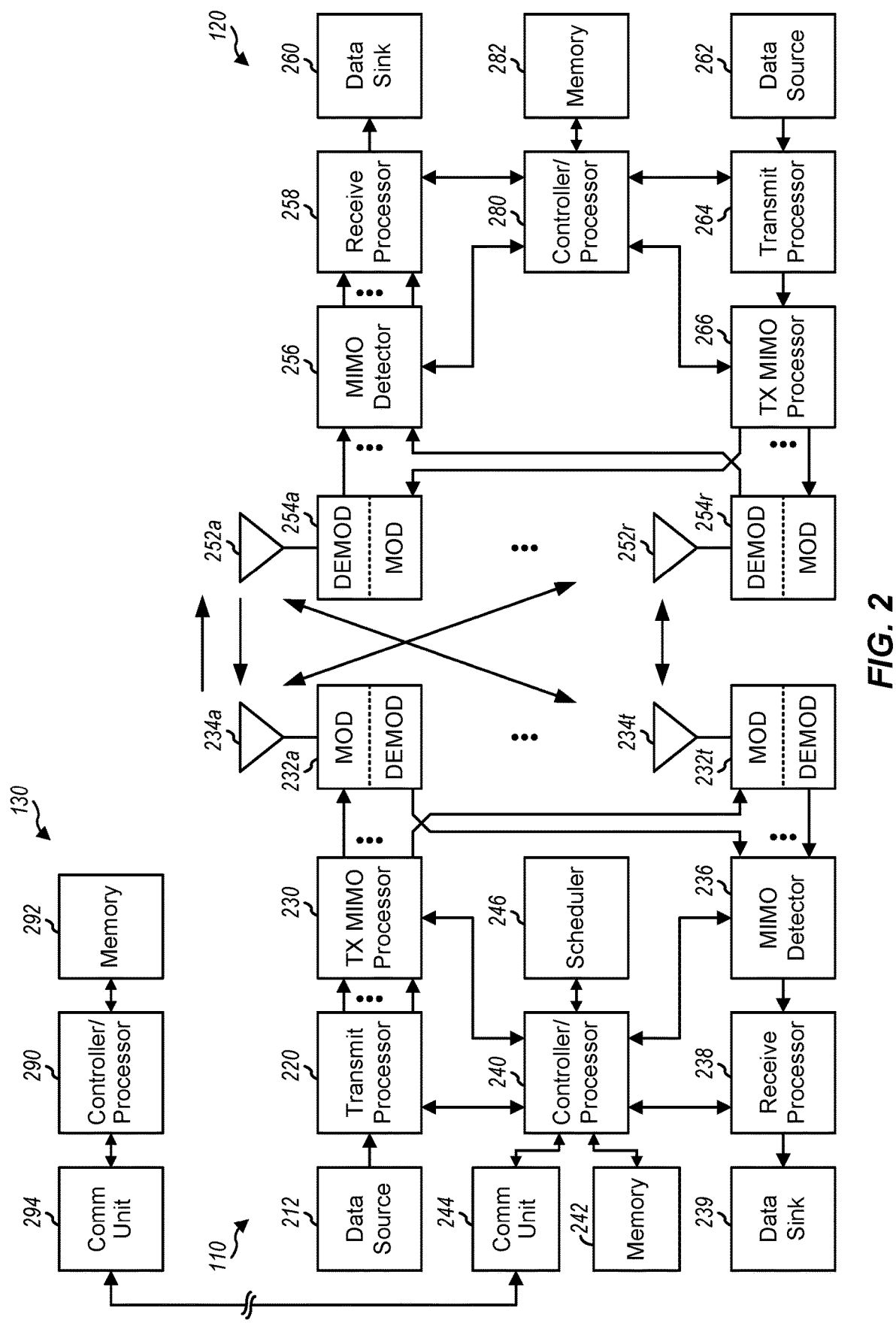
FIG. 2 shows a block diagram conceptually illustrating an example of a base station in communication with a user equipment (UE) in a wireless communications network, in accordance with certain aspects of the present disclosure.

FIG. 2 shows a block diagram of a design of base station/eNB 110 and UE 120, which may be one of the base stations/eNBs and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 may direct the operation at base station 110 and UE 120, respectively. Processor 240 and/or other processors and modules at base station 110, and/or processor 280 and/or other processors and modules at UE 120, may perform or direct processes for the techniques described herein. Memories 242 and 282 may store data and program codes for base station 110 and UE 120, respectively. A scheduler 246 may schedule UEs for data transmission on the downlink and/or uplink.

When transmitting data to the UE 120, the base station 110 may be configured to determine a bundling size based at least in part on a data allocation size and precode data in bundled contiguous resource blocks of the determined bundling size, wherein resource blocks in each bundle may be precoded with a common precoding matrix. That is, reference signals such as UE-RS and/or data in the resource blocks may be precoded using the same precoder. The power level used for the UE-RS in each RB of the bundled RBs may also be the same.

The UE 120 may be configured to perform complementary processing to decode data transmitted from the base station 110. For example, the UE 120 may be configured to determine a bundling size based on a data allocation size of received data transmitted from a base station in bundles of contiguous resource blocks (RBs), wherein at least one reference signal in resource blocks in each bundle are precoded with a common precoding matrix, estimate at least one precoded channel based on the determined bundling size and one or more reference signals (RSs) transmitted from the base station, and decode the received bundles using the estimated precoded channel.

Figure 3:
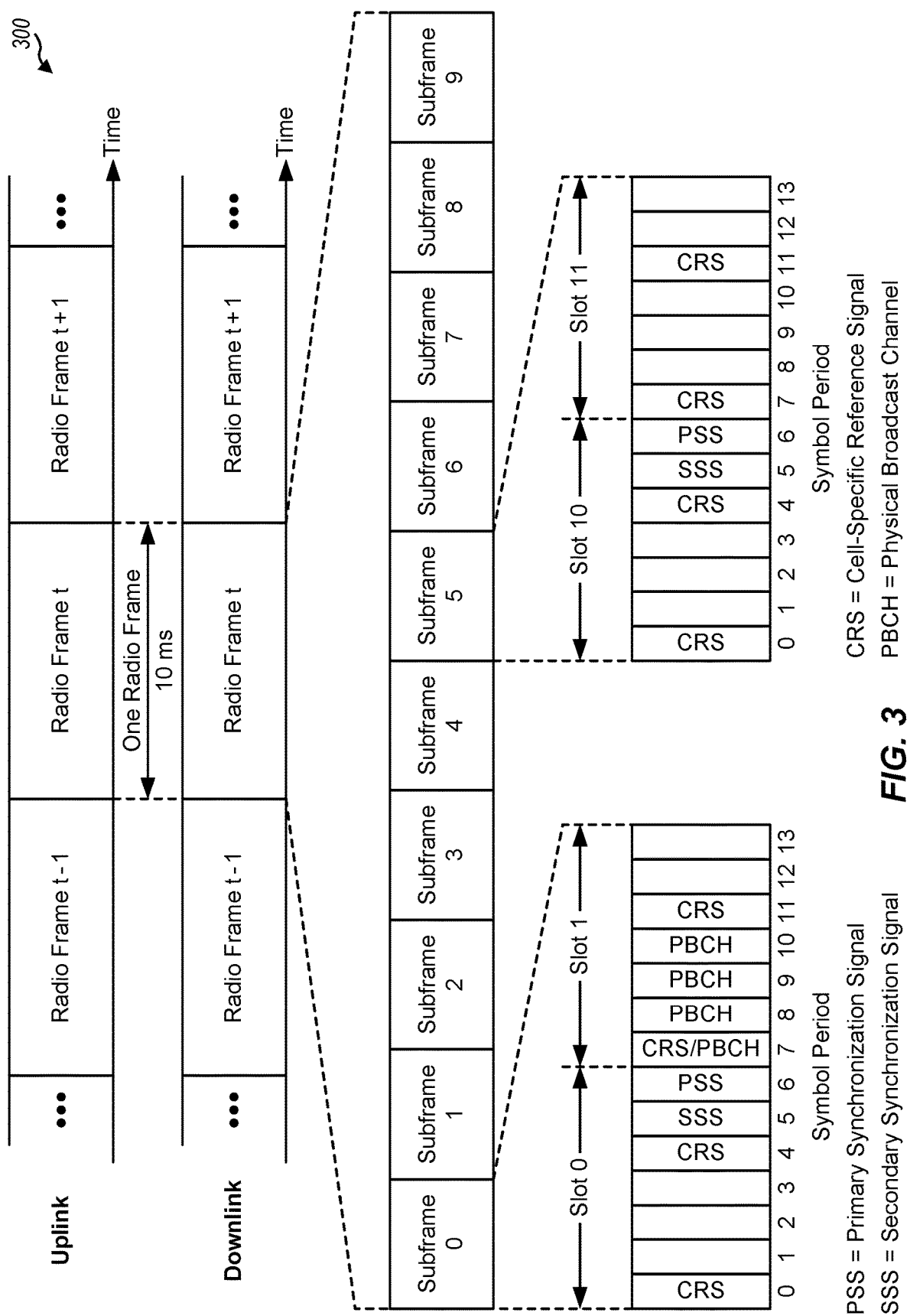
FIG. 3 is a block diagram conceptually illustrating an example of a frame structure in a wireless communications network, in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

Figure 4:
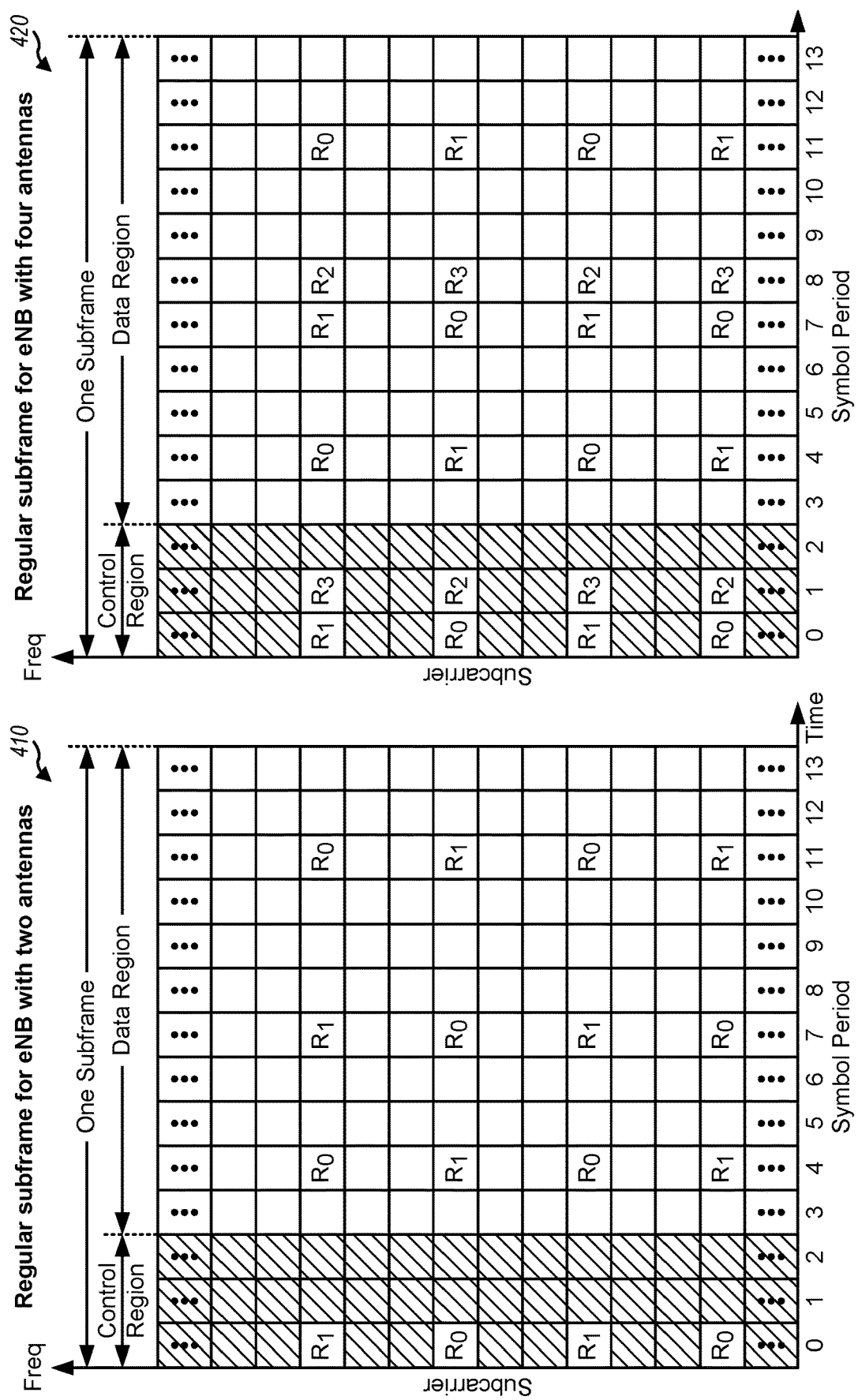
FIG. 4 is a block diagram conceptually illustrating two exemplary subframe formats with the normal cyclic prefix.

FIG. 4 shows two exemplary subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission request (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

Example Enhanced TTI Bundling Design for MTC

The focus of the traditional LTE design is on the improvement of spectral efficiency, ubiquitous coverage, and enhanced quality of service (QoS) support, etc. Current LTE system DL and uplink UL link budgets are designed for coverage of high end devices, such as state-of-the-art smartphones and tablets. However, low cost low rate devices need to be supported as well. For example, for MTC, maximum bandwidth may be reduced, a single receive radio frequency (RF) chain may be used, peak rate may be reduced, transmit power may be reduced, and half duplex operation may be performed.

In addition to low cost, link budget requirements could be increased, for example, 20 dB coverage enhancement to cover devices in the basement. In order to meet this coverage increase, large TTI bundling has been proposed to achieve 20 dB link budget gain. For example, transmission time interval (TTI) bundling with large bundling size for both downlink (e.g., physical broadcast channel (PBCH), physical downlink control channel (PDCCH) and enhanced PDCCH, physical hybrid automatic repeat request (HARQ) indicator channel (PHICH), and physical downlink shared channel (PDSCH)) and uplink (e.g., random access channel (RACH), physical uplink control channel (PUCCH), and physical uplink shared channel (PUSCH)) channels may be used.

However, with large TTI bundling size, power consumption and system efficiency are a concern, particularly, for a UE to support large bundling for both DL and UL. For example, the UE may be need to support bundling of 64 to get PDCCH grant, then transmit with PUSCH bundling of 128, then receive DL ACK with bundling of 16, etc.

In certain systems (e.g., long term evolution (LTE) Release 8), TTI (e.g., subframe) bundling may be configured on a per user equipment (UE) basis. The subframe bundling operation is configured by the parameter ttiBundling, which is provided by higher layers. Typically, TTI bundling is performed by sending data from a UE in an uplink shared channel over multiple TTIs to the base station—bundling is not applied to other uplink signals/traffic (e.g., uplink control information).

The bundling size is fixed at 4 TTIs (subframes), that is, PUSCH is transmitted in four consecutive subframes and the same HARQ process number is used in each of the bundled subframes. The resource allocation size is restricted to no more than three resource blocks (RBs). The modulation order is set to 2 (quadrature phase-shift keying (QPSK)). Each bundle is treated as a single resource, for example, a single grant and a single HARQ acknowledgment (ACK) are used for each bundle.

TTI bundling is typically used for low rate traffic. For example, if voice over internet protocol (VoIP) packets cannot be transmitted in a single TTI due to a low uplink link budget, Layer 2 (L2) segmentation may be applied. For example, a VoIP packet may be segmented in four radio link control (RLC) protocol data units (PDUs) that are transmitted in four consecutive TTIs. 2-3 HARQ retransmissions may be targeted to achieve sufficient coverage.

However, the conventional approach may be inefficient. Each additional segment introduces a 1 byte RLC, 1 byte medium access control (MAC), and 3 byte L1 cyclic redundancy check (CRC) overhead. This may amount to, for example, a 15% overhead assuming a 33 byte RLC service data unit (SDU) size. In the case of 4 segments, there is an additional L1/L2 overhead of 45%.

Another drawback to the conventional approach is that HARQ transmissions/retransmissions for every segment may require grants on PDCCH, consuming significant PDCCH resources. Additionally, each HARQ transmission or retransmission is followed by HARQ feedback on PHICH. Assuming a NACK/ACK error ratio of $10^{-3}$, the large number of HARQ feedback signals leads to high packet loss probabilities. For example, if 12 HARQ feedback signals are sent, the HARQ feedback error ratio may be on the order of $1.2*10^{-2}$. Packet loss rates of more than $10^{-2}$ are unacceptable for VoIP traffic.

Usage of only a single uplink grant and a single PHICH signal per TTI bundle would be advantageous. L1 and L2 overhead may be minimized since no L2 segmentation is required. Coverage improvements for medium data rate PUSCH and UL VoIP is also desirable with a minimum gain of 1 dB for both medium data rate PUSCH and UL VoIP.

One issue to be resolved is, how to increase efficiency for large bundling 20 dB coverage (e.g., for devices that are plugged into an outlet). One issue is how to adapt to channel conditions for different user conditions where different bundling size is required, instead of always using worst case. Another issue to be resolved is what PHICH bundle size to use, for example, if the UE uses PUSCH with bundle size 128.

Various approaches to enhance MTC operation with large bundling and low power for devices deployed in difficult to reach locations such as a basement are provided herein. Techniques and apparatus are provided herein for enhanced TTI bundling with large bundling size using bundle size mapping, fixed bundling size, and signaling of bundle size to determine bundle sizes. Also provided herein are techniques for persistent scheduling with large bundle size and early termination.

Aspects of the present disclosure provide techniques for enhanced transmission time interval (TTI) bundling design for machine type communications (MTC). TTI bundling size may be fixed by a one-to-one or a one-to-many mapping. Bundling sizes may be determined (or dictated) for a channel based on bundling sizes used for signals by another channel. Persistent scheduling can also be used to transmit a channel, where a modulation and coding scheme (MCS), rate, or transmit power can be adjusted for transmission of the channel.

For severely coverage limited UEs, link budget enhancements for all DL channels may be desired. According to certain aspects, a fixed set of bundling sizes may be used for all channels. In aspects, there may be a one-to-one mapping without any blind decoding or additional signaling. Alternatively, there may be a one-to-many mapping with limited set of possibilities, further down-selected by blind detection or signaling.

According to certain aspects, the combination of bundling sizes for DL and UL channels may be defined in the specification. Alternatively, the bundling sizes for DL and UL channels may be signaled in one-to-one or one-to-many mapping. For example, PBCH may have a fixed bundling size of 64, system information block (SIB) may have fixed bundling size of 128, RACH may have a fixed bundling size of 16, and Message 3 may have fixed bundling size of 64. Additionally, PUSCH may have a fixed bundling size of 128, PHICH may have a fixed bundling size of 32, and PDCCH may have a fixed bundling size of 32. Alternatively, PUSCH may have a fixed bundling size of 16, PHICH may have a fixed bundling size of 4, and PDCCH may have a fixed bundling size of 4. In another alternative, PUSCH may have a fixed bundling size of 64, PHICH may have a fixed bundling size of either 4 or 8, and PDCCH may have a fixed bundling size of either 2 or 4.

According to certain aspects, once the UE acquires the system from the first channel(s), the UE may know the rest or a limited set of parameters for other channels. For example, PBCH/SIB/ePDCCH may have a fixed mapping of bundle size. In this case, the UE may discover that PBCH has a bundle size of 8, then the UE may know that SIB has a bundle size of 16 and ePDCCH has aggregation level 8 and bundle size 8. In another example, the UE may discover that PBCH has a bundle size of 16, then the UE may know that SIB has a bundle size of 32 and ePDCCH has aggregation level 8 and bundle size 16.

In aspects, for RACH, the bundle size of RACH may be signaled in PBCH/SIB or directly mapped to the TTI bundle size of PBCH/SIB. For example, based on the bundling size of primary synchronization signal (PSS)/secondary synchronization signal (SSS)/PBCH/SIB, the bundle size for RACH Msg 1, 3, 5 may be determined.

According to certain aspects, the bundling size of one channel may be determined based on the bundle size of a different channel. In aspects, the UE may determine the bundling size for DL channels based on the assigned bundle size for UL channels. For example, based on the assigned bundle size for PUSCH transmission, the UE may be determine the bundle size for dynamic PDCCH or PHICH. In aspects, the UE may determine the bundling size for UL channels based on the assigned bundle size for DL channel. For example, based on the assigned bundling size for ePDCCH/PDCCH the UE may determine the bundling size for PUCCH ACK.

Persistent assignments may be used in order to reduce the overhead due to bundled PDCCH/ePDCCH assignments. However, one drawback of persistent scheduling is that it cannot adapt to channel variation and payload size changes. According to certain aspects, large bundling size by may be assigned via persistent scheduling and early termination of a packet may be allowed. On the UL, the UE may be signaled to transmit with TTI bundle size of N, but provide multiple PHICH resources for the UE to monitor before it finishes the entire TTI bundle. This may avoid dynamic grant change and PHICH may have much less overhead and be easier to power boost. Alternatively, the UE may be instructed to monitor dynamic PDCCH grant to indicate both early termination and new transmission. In aspects, the instruction may be indicated in the specification or via signaling.

As an example, PUSCH transmission may be persistently scheduled for TTI bundle size of 128, but allow the UE to early terminate at TTI bundle of 64 or 96. Thus, if the eNB early decodes, it can signal the UE to stop transmitting over the remaining TTIs. The PHICH may still map to the physical resource block (PRB). Additionally, PHICH can be bundled or power boosted for link budget improvements According to certain aspects, PS may have fixed RB size. Modulation and coding scheme (MCS)/rates may be adapted, within a limited set, based on UL payload size or may be linked to power control and early termination. This may provide PDCCH/ePDCCH overhead and power savings. On the UL, this can be UE rate selection or eNB blind decoding of full rate/half rate, etc.

According to certain aspects, if early termination is supported, then the UE may transmit at max power and rely on early termination to adapt to the channel and interference conditions. If early termination is not supported, the UE may automatically adjust transmit power according to the chosen transport block (TB) size and keep the same bundled TTI transmission. According to certain aspects, on the DL, the eNB can provide multiple rates within the persistent assignment (UE may blind decode) and allow the UE to transmit PHICH for early termination.

Figure 5:
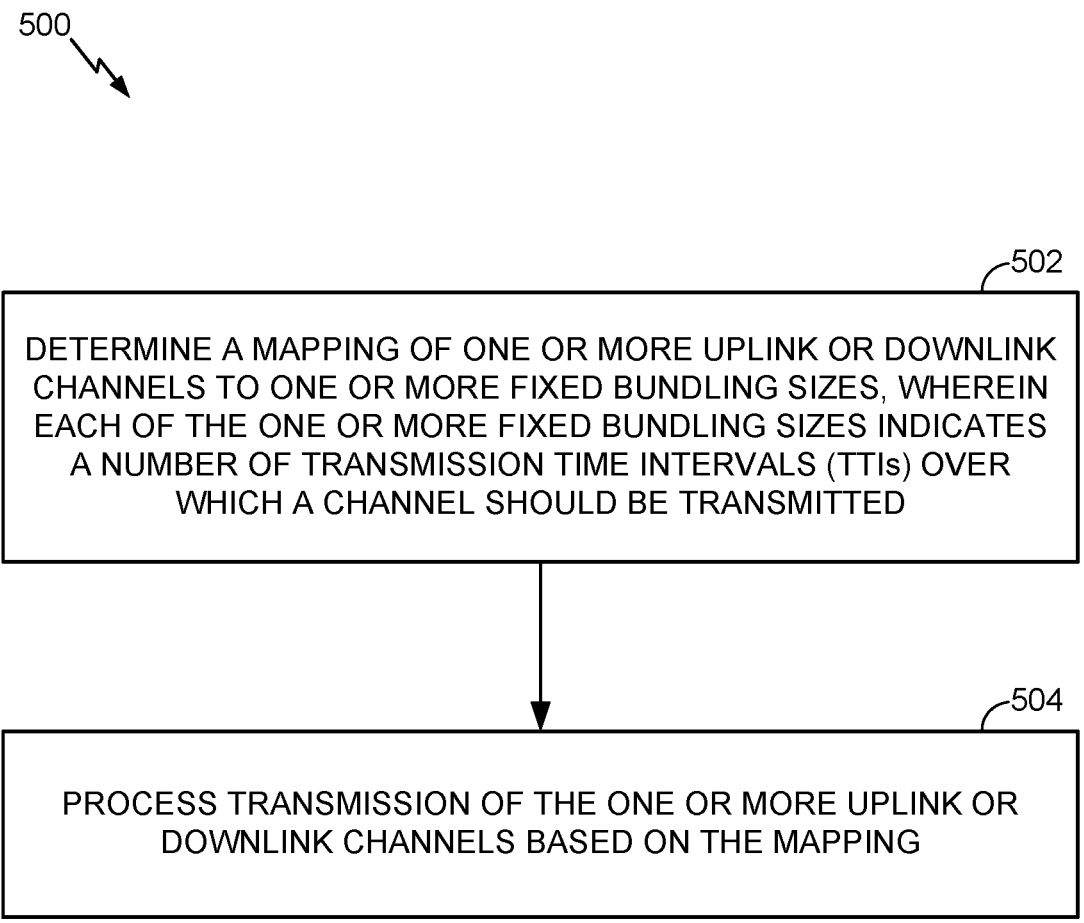
FIG. 5 illustrates example operations for enhanced uplink coverage that may be performed by a wireless device, in accordance with certain aspects of the present disclosure.

FIG. 5 illustrates example operations 500 for wireless communications, in accordance with certain aspects of the present disclosure. The operations 500 may be performed, for example, by a wireless device. The operations 500 may begin, at 502, by determining a mapping of one or more uplink (e.g., PUSCH, RACH Msg 1, RACH Msg 3) or downlink (e.g., PDCCH, PBCH, PHICH, SIB) channels to one or more fixed bundling sizes, wherein each bundling size indicates a number of transmission time intervals (TTIs) over which a channel should be transmitted. In aspects, the mapping may be a one-to-one mapping of that channel to a single fixed bundling size or a one-to-many mapping of a channel to a set of potential bundling sizes.

At 504, the wireless device processes transmission of the one or more uplink or downlink channels based on the mapping. For example, the device may transmit and/or receive the one or more uplink or downlink channels in accordance with the mapping. According to certain aspects, the wireless device may determine an actual bundling size used from the set via blind detection. In aspects, the wireless device may receive signaling indicating one or more bundling sizes from the set.

In aspects, a bundling size for one channel may dictate a bundling size for one or more other channels. For example, the bundling size for each of the one or more other channels may be proportionate to the bundling size number of the one channel. Alternatively, the bundling size for an uplink channel may dictate a bundling size for one or more downlink channels or a bundling size for the downlink channel may dictate a bundling size for the one or more uplink channels.

In aspects, a bundling size for a RACH may be signaled in a PBCH or a SIB. Alternatively, a bundling size for RACH is mapped to a bundling size of a PBCH or a SIB. In aspects, a bundling size of Msg 1 (RACH), Msg 2 (RACH response), Msg 3, or Msg 4 may be mapped to a bundling size of at least one of PSS, SSS, PBCH, or SIB. In aspects, the bundling size of a RACH message is determined based on the bundling size of a different RACH message. For example, the bundling size for RACH Msg 2 may be determined based on the bundling size for RACH Msg 1 or RACH Msg 3.

Figure 6:
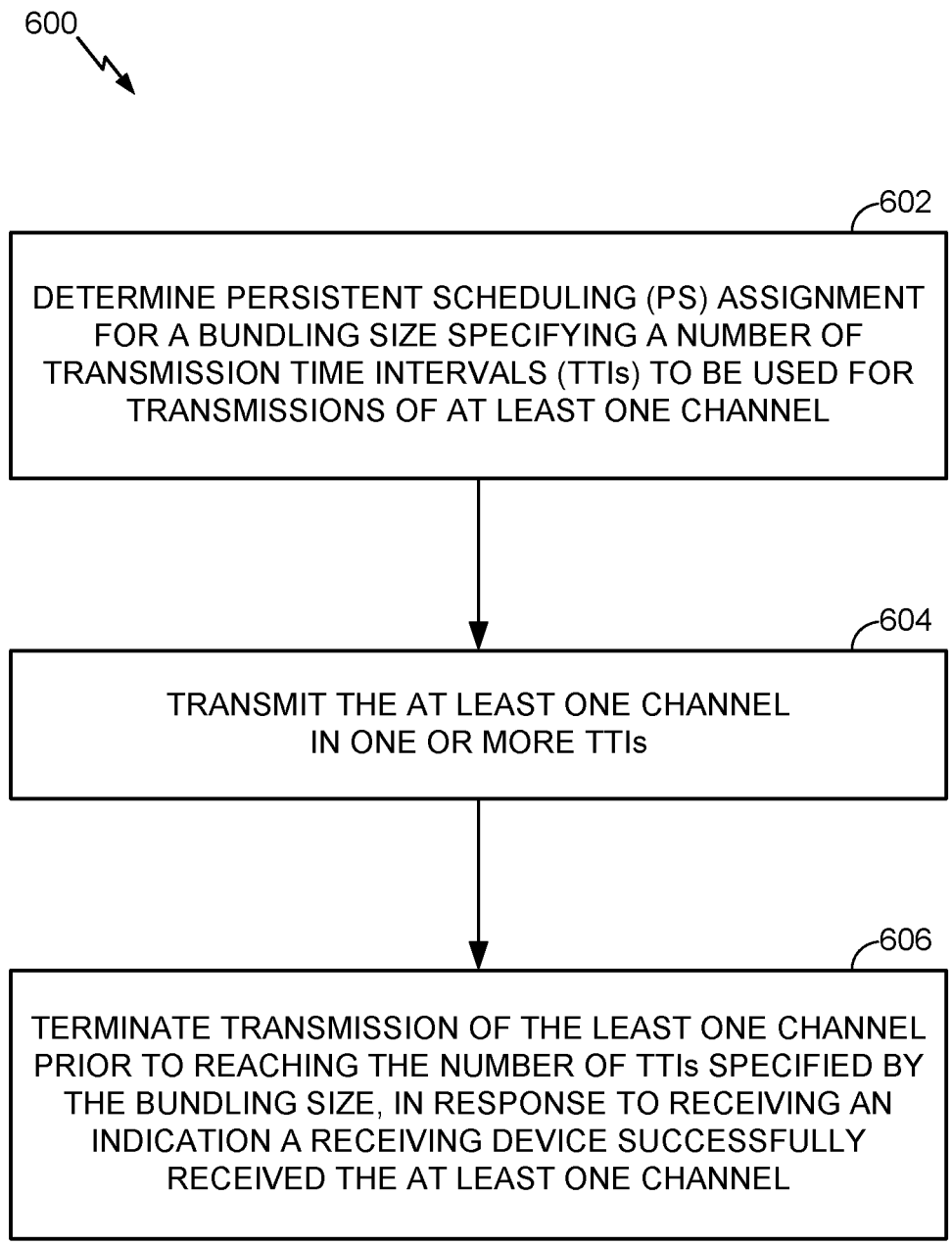
FIG. 6 illustrates example operations for enhanced uplink coverage that may be performed by a wireless device, in accordance with certain aspects of the present disclosure.

FIG. 6 illustrates example operation 600 for wireless communications, in accordance with certain aspects of the present disclosure. The operations 600 may be performed, for example, by a wireless device. The operations 600 may begin, at 602, by determining persistent scheduling (PS) assignment for a bundling size specifying a number of transmission time intervals (TTIs) to be used for transmissions of at least one channel.

At 604, the wireless device transmits the at least one channel in one or more TTIs.

At 606, the wireless device terminates transmission of the at least one channel prior to reaching the number of TTIs specified by the bundling size, in response to receiving an indication (e.g., via a PDCCH grant or PHICH) a receiving device successfully received the at least one channel.

Figure 7:
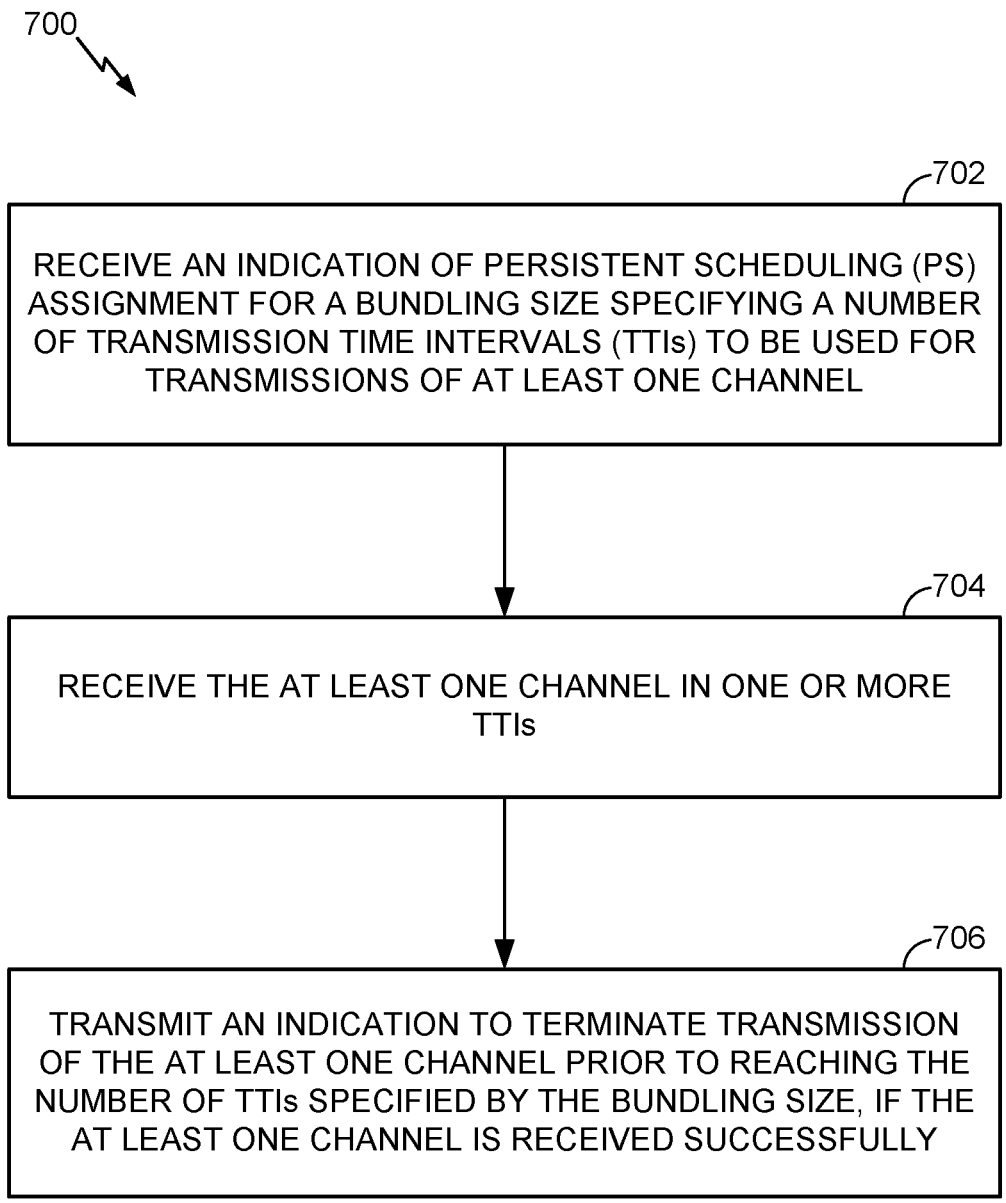
FIG. 7 illustrates example operations for enhanced uplink coverage that may be performed by a wireless device, in accordance with certain aspects of the present disclosure.

FIG. 7 illustrates example operations 700 for wireless communications, in accordance with certain aspects of the present disclosure. The operations 700 may be performed, for example, by a wireless device. The operations 700 may begin, at 702, by receiving an indication of persistent scheduling (PS) assignment for a bundling size specifying a number of transmission time intervals (TTIs) to be used for transmissions of at least one channel.

At 704, the wireless device receives the at least one channel in one or more TTIs.

At 706, the wireless device transmits an indication (e.g., via PDCCH grant, ePDCCH, PHICH, or a bundled version of PDCCH, ePDCCH, or PHICH) to terminate transmission of the at least one channel prior to reaching the number of TTIs specified by the bundling size, if the at least one channel is received successfully.

Figure 8:
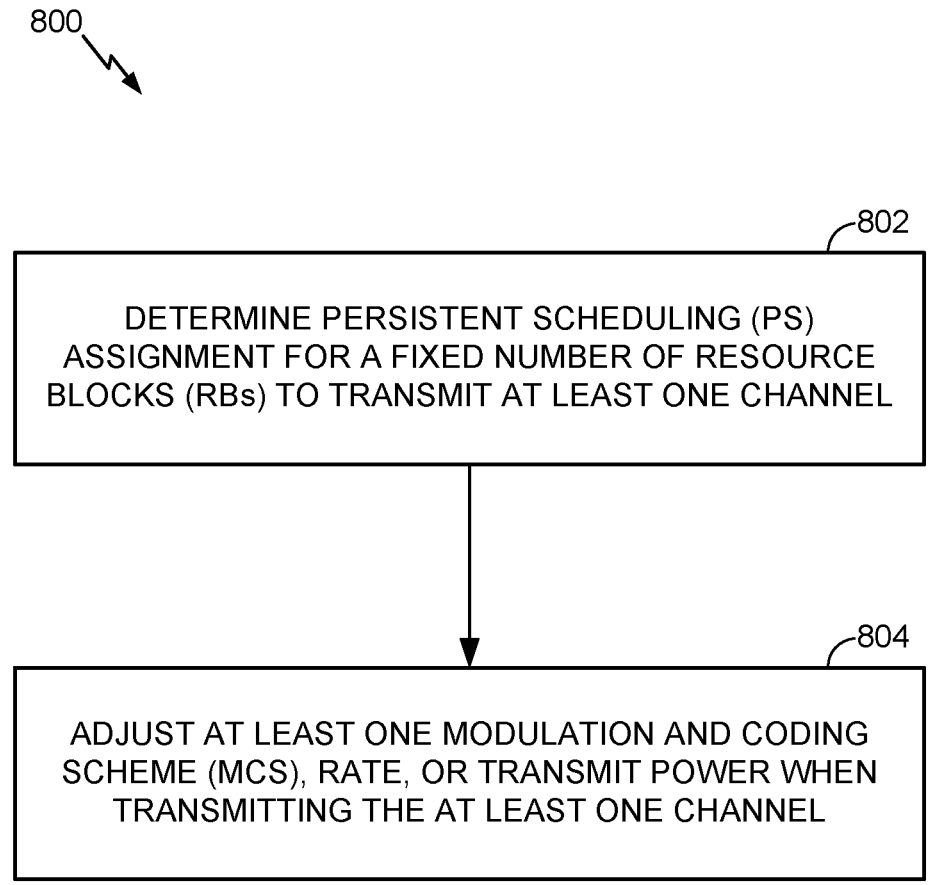
FIG. 8 illustrates example operations for enhanced uplink coverage that may be performed by a wireless device, in accordance with certain aspects of the present disclosure.

FIG. 8 illustrates example operation 800 for wireless communications, in accordance with certain aspects of the present disclosure. The operations 800 may be performed, for example, by a wireless device. The operations 800 may begin, at 802, by determining persistent scheduling (PS) assignment (e.g., indicating a bundle size of TTIs) for a fixed number of resource blocks (RBs) to transmit at least one channel.

At 804, the wireless device adjusts at least one a modulation and coding scheme (MCS), rate, or transmit power when transmitting the at least one channel. For example, the wireless device may adjust the MCS, rate, or transmit power based on payload size of the channel. In aspects, the wireless device may adjust between a limited set of MCS or rates. According to certain aspects, the wireless device may terminate transmission of the at least one channel prior to reaching the number of TTIs specified by the bundling size, in response to receiving an indication a receiving device successfully received the at least one channel. In aspects, the at least one channel is an uplink channel and the adjusting comprises transmitting the uplink channel at a UE-selected rate.

Figure 9:
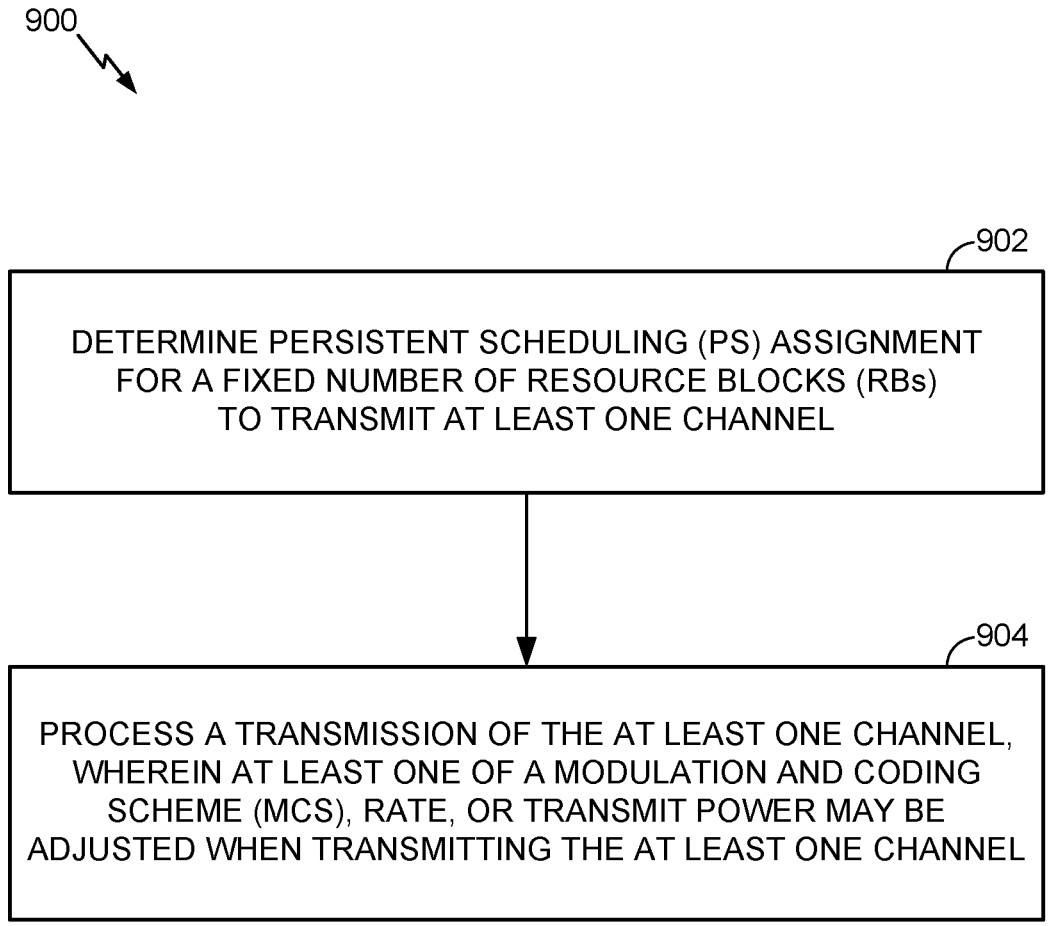
FIG. 9 illustrates example operations for enhanced uplink coverage that may be performed by a wireless device, in accordance with certain aspects of the present disclosure.

FIG. 9 illustrates example operation 900 for wireless communications, in accordance with certain aspects of the present disclosure. The operations 900 may be performed, for example, by a wireless device. The operations 900 may begin, at 902, by determining persistent scheduling (PS) assignment (e.g., indicating a bundle size of TTIs) for a fixed number of resource blocks (RBs) to transmit at least one channel.

At 904, the wireless device processes (e.g., blind detection to determine an adjusted rate) a transmission of the at least one channel, wherein at least one of a modulation and coding scheme (MCS), rate, or transmit power may be adjusted when transmitting the at least one channel. For example, the wireless device may adjust the MCS, rate, or transmit power based on payload size of the channel. In aspects, the wireless device may adjust between a limited set of MCS or rates. In aspects, the wireless device may receive signaling indicating a set of rates available within the PS assignment.

According to certain aspects, the wireless device may terminate transmission of the at least one channel prior to reaching the number of TTIs specified by the bundling size, in response to receiving an indication a receiving device successfully received the at least one channel. In aspects, the at least one channel is an uplink channel and the adjusting comprises transmitting the uplink channel at a UE-selected rate.

The term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the corresponding functions. The means may include various hardware and/or software/firmware component(s) and/or module(s), including, but not limited to a circuit, an application specific integrated circuit (ASIC), or processor. Generally, where there are operations illustrated in Figures, those operations may be performed by any suitable corresponding counterpart means-plus-function components.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as electronic hardware, software/firmware, or combinations thereof. To clearly illustrate this interchangeability of hardware and software/firmware, various illustrative components, blocks, modules, circuits, and steps have been described above generally in terms of their functionality. Whether such functionality is implemented as hardware or software/firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or in a combination thereof. A software/firmware module may reside in RAM memory, flash memory, ROM memory, EPROM memory, EEPROM memory, PCM (phase change memory), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for wireless communications by a wireless device, comprising:
  determining a first bundling size of first one or more communications on a first channel based at least in part on a mapping of the first one or more communications to one or more bundling sizes, wherein each of the one or more bundling sizes indicates a number of transmission time intervals (TTIs) over which the first one or more communications should be transmitted or received, and wherein a second bundling size of second one or more communications on a second channel is determined based at least in part on the determined first bundling size; and
  processing the first one or more communications based at least in part on the determined first bundling size.

2. The method of claim 1, wherein the first channel comprises an uplink channel and the second channel comprises a downlink channel.

3. The method of claim 1, wherein the first channel comprises a downlink channel and the second channel comprises an uplink channel.

4. The method of claim 1, wherein the first channel comprises a physical broadcast channel (PBCH) and the second channel comprises a downlink control channel.

5. The method of claim 1, wherein the first channel comprises a random access channel (RACH), and the mapping is signaled in at least one of a physical broadcast channel (PBCH) or a system information block (SIB).

6. The method of claim 1, wherein the first channel comprises a physical broadcast channel (PBCH) and the second channel comprises a random access channel (RACH).

7. The method of claim 1, wherein the first one or more communications on the first channel comprise at least one of: a primary synchronization signal (PSS), a secondary synchronization signal (SSS), a communication on a physical broadcast channel (PBCH), or a system information block (SIB), and the second one or more communications on the second channel comprise at least one of: a random access Msg 1, a random access Msg 2, a random access Msg 3, or a random access Msg 4.

8. The method of claim 1, wherein the first one or more communications comprise a first random access message and the second one or more communications comprise a different random access message.

9. The method of claim 1, wherein the first one or more communications comprise at least one of: one or more communications on an uplink shared channel, a random access Msg 1, or a random access Msg 3.

10. The method of claim 1, wherein the first channel comprises at least one of a downlink control channel, a physical broadcast channel (PBCH), a physical HARQ indicator channel (PHICH), a downlink shared channel, or a combination thereof.

11. The method of claim 1, wherein the processing comprises identifying a bundling size of a downlink channel based on a bundling size of an uplink channel.

12. The method of claim 11, wherein the processing comprises identifying the bundling size of at least one of a downlink control channel or a physical HARQ indicator channel (PHICH) based on the bundling size of an uplink shared channel.

13. The method of claim 1, wherein the processing comprises identifying a bundling size of an uplink channel based on a bundling size of a downlink channel.

14. The method of claim 13, wherein the processing comprises identifying the bundling size of an uplink control channel acknowledgment (ACK) based on the bundling size of a downlink control channel.

15. The method of claim 1, wherein the processing comprises transmitting the first one or more communications on the first channel based at least in part on the determined first bundling size.

16. The method of claim 1, wherein the processing comprises receiving the first one or more communications on the first channel based at least in part on the determined first bundling size.

17. The method of claim 1, wherein the mapping comprises a one-to-one mapping of the first channel to a single bundling size.

18. The method of claim 1, wherein the mapping comprises a one-to-many mapping of the first channel to a set of potential bundling sizes.

19. The method of claim 18, further comprising determining an actual bundling size from the set of potential bundling sizes via blind detection.

20. The method of claim 19, further comprising receiving signaling indicating one or more bundling sizes from the set of potential bundling sizes.

21. The method of claim 1, wherein the first channel comprises a downlink control channel, and the second channel comprises a downlink shared channel.

22. An apparatus for wireless communications, comprising:
  at least one processor;
  memory coupled to the at least one processor, the memory comprising instructions executable by the at least one processor to cause to the apparatus to:
    determine a first bundling size of first one or more communications on a first channel based at least in part on a mapping of the first one or more communications to one or more bundling sizes, wherein each of the one or more bundling sizes indicates a number of transmission time intervals (TTIs) over which the first one or more communications should be transmitted, and wherein a second bundling size of second one or more communications on a second channel is determined based at least in part on the determined first bundling size; and
    process the first one or more communications based at least in part on the determined first bundling size.

23. The apparatus of claim 22, wherein the first channel comprises an uplink channel and the second channel comprises a downlink channel.

24. The apparatus of claim 22, wherein the first channel comprises a downlink channel and the second channel comprises an uplink channel.

25. The apparatus of claim 22, wherein the first channel comprises a physical broadcast channel (PBCH) and the second channel comprises a downlink control channel.

26. The apparatus of claim 22, wherein the first channel comprises a random access channel (RACH), and the mapping is signaled in at least one of a physical broadcast channel (PBCH) or a system information block (SIB).

27. The apparatus of claim 22, wherein the first channel comprises a physical broadcast channel (PBCH) and the second channel comprises a random access channel (RACH).

28. The apparatus of claim 22, wherein the first one or more communications on the first channel comprise at least one of: a primary synchronization signal (PSS), a secondary synchronization signal (SSS), a communication on a physical broadcast channel (PBCH), or a system information block (SIB), and the second one or more communications on the second channel comprise at least one of: a random access Msg 1, a random access Msg 2, a random access Msg 3, or a random access Msg 4.

29. The apparatus of claim 22, wherein the first one or more communications comprise a first random access message and the second one or more communications comprise a different random access message.

30. The apparatus of claim 22, wherein the first one or more communications comprise at least one of: one or more communications on an uplink shared channel, a random access Msg 1, or a random access Msg 3.

31. The apparatus of claim 22, wherein the first channel comprises at least one of a downlink control channel, a physical broadcast channel (PBCH), a physical HARQ indicator channel (PHICH), a downlink shared channel, or a combination thereof.

32. The apparatus of claim 22, wherein the processing comprises identifying a bundling size of a downlink channel based on a bundling size of an uplink channel.

33. The apparatus of claim 32, wherein the processing comprises identifying the bundling size of at least one of a downlink control channel or a physical HARQ indicator channel (PHICH) based on the bundling size of an uplink shared channel.

34. The apparatus of claim 22, wherein the processing comprises identifying a bundling size of an uplink channel based on a bundling size of a downlink channel.

35. The apparatus of claim 34, wherein the processing comprises identifying the bundling size of an uplink control channel acknowledgment (ACK) based on the bundling size of a downlink control channel.

36. The apparatus of claim 22, wherein the processing comprises transmitting the first one or more communications on the first channel based at least in part on the determined first bundling size.

37. The apparatus of claim 22, wherein the processing comprises receiving the first one or more communications on the first channel based at least in part on the determined first bundling size.

38. The apparatus of claim 22, wherein the mapping comprises a one-to-one mapping of the first channel to a single bundling size.

39. The apparatus of claim 22, wherein the mapping comprises a one-to-many mapping of the first channel to a set of potential bundling sizes.

40. The apparatus of claim 39, wherein the instructions are further executable by the at least one processor to cause the apparatus to determine an actual bundling size from the set of potential bundling sizes via blind detection.

41. The apparatus of claim 40, wherein the instructions are further executable by the at least one processor to cause the apparatus to receive signaling indicating one or more bundling sizes from the set of potential bundling sizes.

42. The apparatus of claim 22, wherein the first channel comprises a downlink control channel, and the second channel comprises a downlink shared channel.

43. An apparatus for wireless communications, comprising:

means for determining a first bundling size of first one or more communications on a first channel based at least in part on a mapping of the first one or more communications to one or more bundling sizes, wherein each of the one or more bundling sizes indicates a number of transmission time intervals (TTIs) over which the first one or more communications should be transmitted, and wherein a second bundling size of second one or more communications on a second channel is determined based at least in part on the determined first bundling size; and means for processing the first one or more communications based at least in part on the determined first bundling size.

44. A non-transitory computer readable medium for wireless communications by an apparatus, the computer readable medium having instructions stored thereon, the instructions executable by at least one processor to cause the apparatus to:

determine a first bundling size of first one or more communications on a first channel based at least in part on a mapping of the first one or more communications to one or more bundling sizes, wherein each of the one or more bundling sizes indicates a number of transmission time intervals (TTIs) over which the first one or more communications should be transmitted, and wherein a second bundling size of second one or more communications on a second channel is determined based at least in part on the determined first bundling size; and process the first one or more communications based at least in part on the determined first bundling size.

* * * * *